United States Patent
Bayer

(10) Patent No.: US 6,796,326 B2
(45) Date of Patent: Sep. 28, 2004

(54) GAS PRESSURE REGULATOR

(75) Inventor: Detlef Bayer, Wadersloh (DE)

(73) Assignee: Mertik Maxitrol GmbH & Co., KG, Thale (DE)

(*) Notice: Subject to any disclaimer, the term of this patent is extended or adjusted under 35 U.S.C. 154(b) by 162 days.

(21) Appl. No.: 10/257,839

(22) PCT Filed: Apr. 17, 2001

(86) PCT No.: PCT/EP01/04301
§ 371 (c)(1),
(2), (4) Date: Oct. 16, 2002

(87) PCT Pub. No.: WO01/79951
PCT Pub. Date: Oct. 25, 2001

(65) Prior Publication Data
US 2003/0102026 A1 Jun. 5, 2003

(30) Foreign Application Priority Data
Apr. 18, 2000 (DE) .......................................... 100 19 049

(51) Int. Cl.⁷ .............................. G05D 16/06; F23N 7/00
(52) U.S. Cl. ............................. 137/505.18; 137/599.18; 137/601.14
(58) Field of Search ....................... 137/505.18, 599.09, 137/601.14

(56) References Cited

U.S. PATENT DOCUMENTS

| | | | | |
|---|---|---|---|---|
| 853,693 A | * | 5/1907 | Healey .................. | 137/599.09 |
| 1,701,191 A | * | 2/1929 | Ray ...................... | 137/601.14 |
| 3,025,077 A | * | 3/1962 | Giuseppe Alfieri .... | 137/599.09 |
| 3,117,591 A | * | 1/1964 | Schutmaat ............. | 137/599.09 |
| 5,358,004 A | * | 10/1994 | Atkinson et al. ...... | 137/505.18 |
| 5,746,245 A | * | 5/1998 | Foster .................. | 137/505.18 |

FOREIGN PATENT DOCUMENTS

| | | |
|---|---|---|
| DE | 40 01 329 | 3/1993 |
| EP | 0 949 455 | 10/1999 |
| FR | 2 447 573 | 8/1980 |
| JP | 61 031778 | 2/1986 |

OTHER PUBLICATIONS

International Search Report, PCT/EP01/04301 dated Aug. 9, 2001.

* cited by examiner

Primary Examiner—Stephen M. Hepperle
(74) Attorney, Agent, or Firm—Harness, Dickey & Pierce, P.L.C.

(57) ABSTRACT

A gas pressure regulator shall be created that shows reproducible features even at minimum through flow values, and at the same time allows keeping its lock up characteristic. In addition, gas burners operated at a large modulating range shall allow ignition as well, with the internal pressure drop being kept as low as possible. Also, manufacturing expenses and number of gasproof connections shall be kept at a minimum. To achieve this, the inlet-side chamber and the outlet-side chamber are connected to each other—in addition to the existing passage that is used for pressure regulating purposes—by one or more separate openings with each of such opening forming a seat for a closing body that is individually assigned to said opening and guided in axial direction to its seat, whereat each such closing body is connected to the armature of an solenoid valve assigned to it. The gas pressure regulator, that serves to control the outlet pressure in a gas pipe leading to a gas burner, comes with an additional feature that allows to supply the gas burner with the start gas volume required for the ignition process.

4 Claims, 2 Drawing Sheets

GAS PRESSURE REGULATOR

CROSS-REFERENCE TO RELATED APPLICATION

This application is a National Stage of International Application No. PCT/EP01/04301, filed Apr. 17, 2001. This application claims the benefit of German Application No. 100 19 049.9, filed Apr. 18, 2000. The disclosures of the above applications are incorporated herein by reference.

BACKGROUND AND SUMMARY OF THE INVENTION

The invention relates to a gas pressure regulator for a gas burner as specified in the introductory clause of the first patent claim.

Gas pressure regulators fitted upstream to gas burners are found in a great number of different designs. Gas pressure regulators that are employed in connection with gas burners operated in on-off mode must maintain a constant outlet pressure at a certain gas flow. In some cases such regulator should have an additional pilot burner and/or a lock up. Gas pressure regulators of commonly known design are well suited for such operation mode as they are able to stabilize a pre-set outlet pressure at a constant level within a certain flow range. If the connected gas burner is switched off, the outlet pressure will slightly rise and through a control diaphragm close the control valve in shut position.

Another application is the regulator's employment in connection with a modulating gas burner. Preferably, there are two options available: A first option is to stabilize the outlet pressure at a constant value. This can be done by fitting a flow controlling device—for example, a motor-actuated butterfly valve—downstream to gas pressure regulator, or by using a zero-pressure regulator to maintain the outlet pressure constantly at zero within a permissible variation. The required gas flow builds up depending on the negative pressure downstream to the burner head. A second option is to allow the outlet pressure to change. This can be achieved, for example, by using a so-called balanced pressure regulator by which the outlet pressure is altered through a control pressure that pressurizes the working diaphragm at its upper face (that is to say the flow is again depending on the outlet pressure), or by using an electronically modulating gas pressure regulator in which regulating is by an electric current—or voltage—that substitutes for the control pressure.

In either case such gas pressure regulator must be able to feed the gas burner with the correct quantity of gas over the full modulating range, and during the ignition process. Gas pressure regulators have the disadvantage that they—especially when operated at small flow rates compared with the maximum permissible flow rate—tend to show vibrations or pumping or get stuck in a certain position. This behavior is caused by mechanical friction between the final control elements. If this phenomenon occurs adjusting reproducible outlet pressure or gas flow values will be disabled. In order to enable adjusting reproducible outlet pressure or gas flow values, a bypass opening is usually employed. The disadvantage is that in this solution the gas pressure regulator has no longer any lock up characteristic.

In addition to the above, gas burners that are operated with a large modulation range can very often not get ignited under low-load condition as the quantity of gas available is not sufficient to form an explosive mixture. Usually, the gas burner is therefore fed through a separate gas tube to receive the quantity of gas required for starting. This gas tube, branching off from the gas main, requires an additional solenoid vale that serves as so-called start-load valve, a regulating valve that is either fixed or can be adjusted in order to control the volume flow; and a feeder line to the gas burner.

The most disadvantageous feature in this solution is that a separate gas tube must be laid what is not only expensive but also creates additional space requirements. Furthermore, there are several additional connections the gasproofness of which must be secured to the environment.

There is known another solution in which the start-load valve is fixed to a balanced pressure regulator so that laying of a separate gas tubing is no longer required. The start-load valve is connected to the balanced pressure regulator's casing by two screws. Said screws both have a longitudinal dead-end bore hole and, for the part protruding inside the balanced pressure regulator's casing, a lateral bore hole; they are screwed into the measuring terminals provided at both the input and output side of the balanced pressure regulator, and this way they serve to control the inflow and outflow of gas. Also in this solution, the gas through-flow is cut off by a solenoid valve of known design. An adjustable aperture provides an additional option to control the volume flow.

Also this solution has the disadvantage that there exist several additional connections the gasproofness of which must be secured to the environment. Moreover, the internal pressure drop is rather high due to the fact that the gas stream must be deviated repeatedly. In addition, the high number of pieces entails high manufacturing expenses. Finally, the distance usable for displacements (for making adjustments) is relatively short which causes the setting accuracy to be inadequate.

The invention is focusing on the issue of developing a gas pressure regulator of the said kind in which the disadvantages of the prior art described herein above are eliminated. This applies in particular to the opportunity of having a reproducible outlet pressure, or through flow, maintained throughout the entire regulating range together with the option to keep said lock up characteristic active. Also, gas burners operating with a large modulating range shall be able to get ignited. Furthermore, the internal pressure drop shall be kept as low as possible. Finally, manufacturing expenses and number of gasproof connections shall be kept at a minimum.

According to the present invention the problem is solved by providing one or more separate openings that connect the inlet-side chamber and the outlet-side chamber in addition to the existing passage that is used for pressure regulating purposes, with each of such opening being provided with a seat for a closing body that is individually assigned to said opening and guided in axial direction to its seat, whereat each closing body is connected to the armature of a solenoid valve assigned to it.

Thus a solution has been found that removes the existing disadvantages of the prior art as described herein above. Further distinguishing features of this solution are above all its simplicity and small production dimensions.

The invention comes with an advantageous arrangement if the gas pressure regulator's casing and the solenoid valve's casing are provided in a single-piece design by which the number of gasproof connections can be further reduced.

In addition, the armature's longitudinal length of stroke can be adjusted so that adjusting the volume flow that is required for the ignition of the gas burner becomes easy.

Another advantageous arrangement of the invention results from the replaceable seat construction. Thus, adjustments to different through flow ranges are possible in a simple manner.

Should, for example, the low-load or start-load conditions be within the non-reproducible regulating range as described herein above this phenomenon can be eliminated by employing a gas pressure regulator of this type with the gas pressure regulator's regulating valve being kept in shut position as long as the gas volume is small enough to possibly cause vibrations. If the gas volume is rising toward the required level, the regulating valve will open to such extent that a reliable and vibration-free regulating is allowed.

If the gas burner is ignited under low-load condition, also the lock up characteristic of the gas pressure regulator remains active. This is achieved even when the gas burner is ignited under start-load condition where said start-load is smaller than the low-load and only the low-load is failing within the critical regulating range.

If, in contrast to the above, both start-load and low-load are falling within the critical regulating range use may be made of a gas pressure regulator that has two separate openings that are controlled by two separate solenoid valves. After igniting the gas burner, the second solenoid valve opens to supply the required small-load volume. Even in this case the lock up characteristic of the gas pressure regulator remains active.

The gas pressure regulator's design option with two separate openings, controlled by two separate solenoid valves, is used also in applications where the gas burner is ignited under start-load condition where said start-load is greater than the low-load. For controlling the ignition process the first solenoid valve is switched on and increases the gas quantity until ignition is completed, after which said solenoid valve is closed in shut position. The low-load quantity is supplied through the second solenoid valve, which means that the lock up characteristic of the gas pressure regulator remains active even under such condition.

BRIEF DESCRIPTION OF THE DRAWINGS

Below is a more detailed description of the invention by means of a practical example. The figures show the following.

DESCRIPTION OF THE PREFERRED EMBODIMENTS

Figure 2:
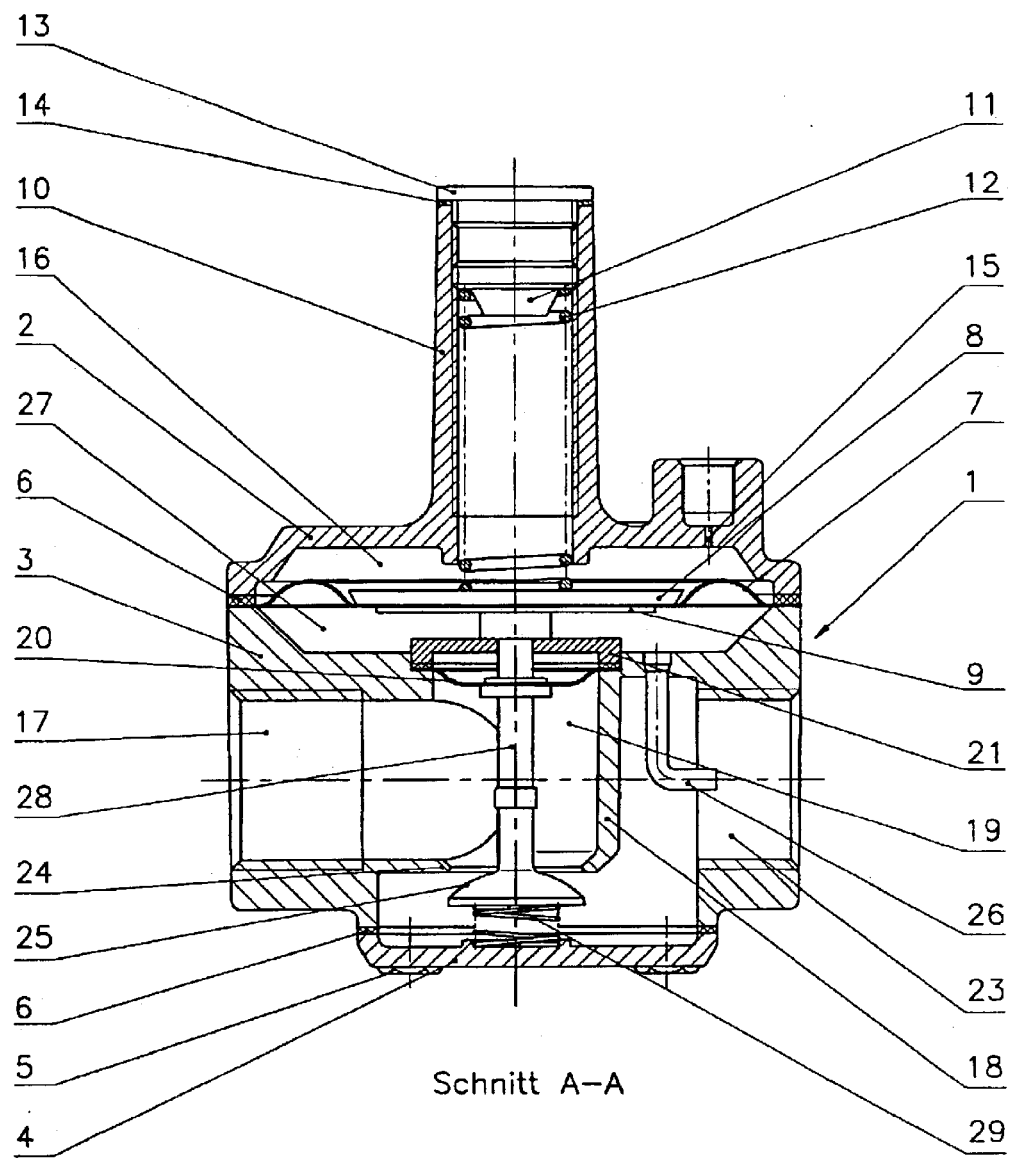
FIG. 2 is a sectional view along line A—A of FIG. 1.

The gas pressure regulator as shown in FIG. 2 as an example according to the invention has a casing (1) made of aluminum, comprising a cover (2), a lower part (3) and a bottom (4). Both cover (2) and lower part (3) as well as lower part (3) and bottom (4) are fixed together by fastening screws. In order to secure the required gasproofness a flat packing (6) is provided between each pair of parts. In addition, between cover (2) and lower part (3) is placed a pressure diaphragm (7), the outer edge of which is clamped between said cover and lower part, with the pressure diaphragm being supported on both sides by an upper diaphragm disk (8) and a lower diaphragm disk (9), respectively, the latter being both arranged in center position.

The cover (2) has of its side away from the lower part (3) a tube-shaped top (10). A pressure piece (11) is screwed-in guided by a thread provided inside said tube-shaped top (10). An adjusting spring (12) rests the pressure piece (11), whereat the spring's opposite end pushes against the upper diaphragm disk (8). A screwed plug (13) is used to seal off the top (10) from the environment. Gasproofness is secured by a gasket (14) placed between the two parts. A vent (15) provided in the cover (2) connects the confined space (16), formed by cover (2) and pressure diaphragm (7), with the environment, or a control pressure (e.g., as built up by a blower).

In the lower part there is a gas inlet (17), which in this practical example is provided with a female thread, connected to the inlet-side chamber (19) formed by a pot-shaped insert (18) that is situated inside the lower part (3) with which it is connected to form one single piece; the inlet-side chamber (19) is sealed toward the cover by a compensating diaphragm (20) the outer edge of which is clamped by a ring (21) pressed into the insert (18). On the insert's (18) face opposite to the compensating diaphragm (20) there is an opening centrally arranged in relation to the ring (21) that is leading into an outlet-side chamber (22) the confined space of which is formed by the lower part (3), the bottom (4) and the insert (18), with said outlet-side chamber (22) in turn being connected to a gas outlet (23) that is situated inside the lower part (3) and also has a female thread. The opening's side facing the bottom (4) is designed as a valve seat (24) to accommodate a valve disk (25) located inside the outlet-side chamber (22), with these parts altogether acting as the gas pressure regulator's pressure regulating valve. Around the gas outlet (23) there is a pressure compensation tubelett (26) that connects the confined space for pressure compensation (27) situated between compensating diaphragm (20) and pressure diaphragm (7) with the outlet-side chamber (22). Underneath the valve disk (25) there is a counter-spring (29) that pushes the valve disk (25) into the valve seat (24) in its resting position.

A hollow shank, that protrudes into the inlet-side chamber (19) and is connected to the valve disk (25) to form one single piece, is fixed on a rod (28) that can be moved in longitudinal direction; said rod (28) goes through the center of the compensating diaphragm (20), that is fixed to the rod, and is guided through the center of the ring (21). The rod's (28) ends far from the valve disk (25) are centrally fixed to either the upper and the lower diaphragm disk (8 & 9). In order to limit the opening stroke length, the ring (21) serves as limit stop to the lower diaphragm disk (9).

Figure 1:
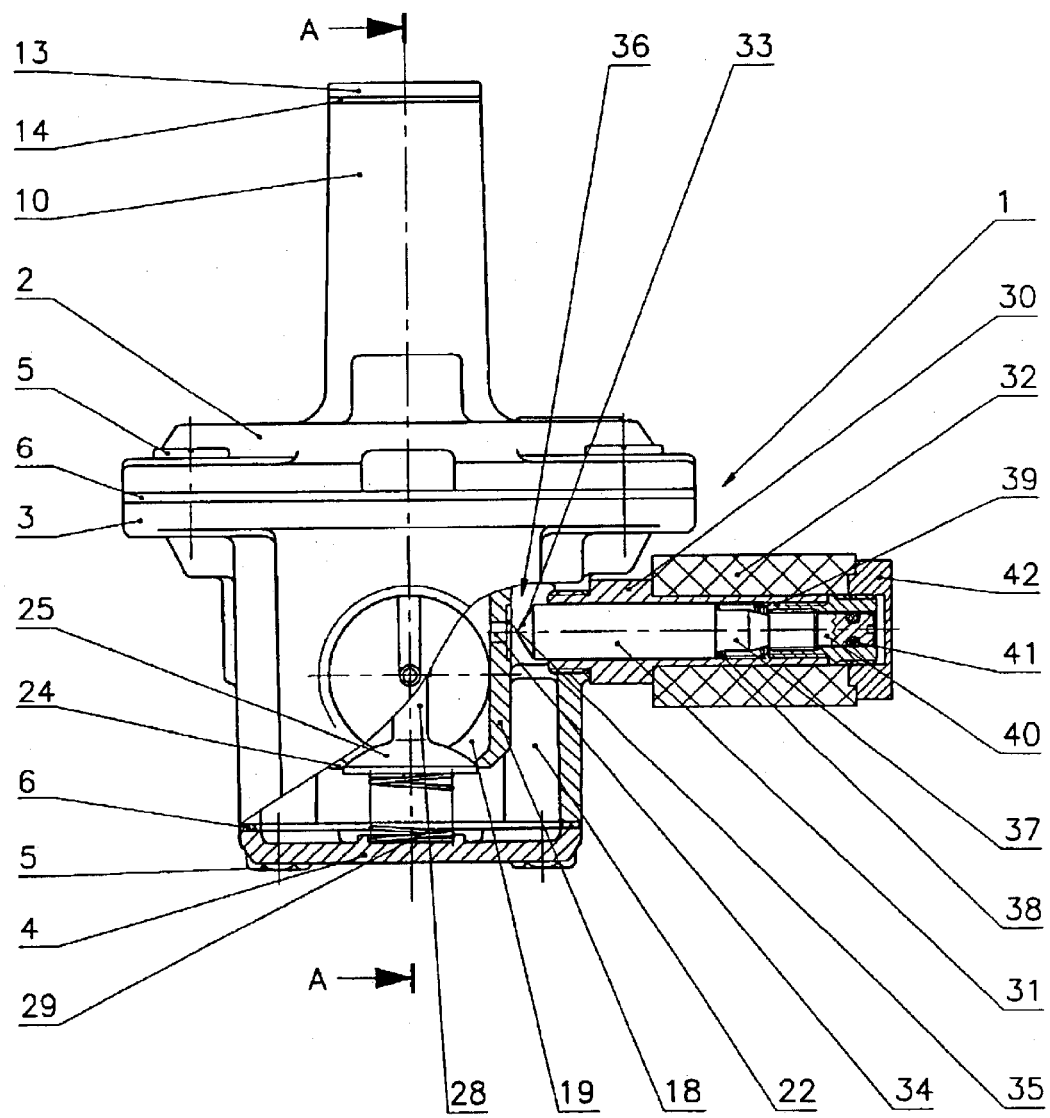
FIG. 1 is a sectional view of a gas pressure regulator, according to the invention.

As can be seen from FIG. 1, a guide bush (30) is screwed gas-tight into the lower part's (3) outer surface shell; the first part of said guide bush (30) goes through the wall and is designed to hold a electro-magnetic drive as described herein below in more detail. Inside said guide bush (30) there is an armature (31) that together with a coil (32) arranged on the guide bush (30) forms an electromagnetic drive, the movement of which is guided in longitudinal direction. The armature's (31) end that protrudes inside the outlet-side chamber (22) is designed as closing body (33), in this practical example having the form of a closing cone. Extended in the armature's (31) axial direction, the insert (18) has an opening (34) that connects the inlet-side chamber (19) with the outlet-side chamber (22), and that serves as seat (35) for the closing body (33). Seat (35) and closing body (33) together form the so-called start-load valve (36). As a further advantageous arrangement, interchangeable sleeves (not shown) can be placed inside the opening (34), with each such sleeve standing for a different opening cross-section of the seat (35).

On its side opposite to the closing body (33), the armature (31) has a necking (37) on which is guided a closing spring

(38) that exercises pressure on said armature (31) so that the closing body (33) rests in its seat (35) and the start-load valve (36) keeps in closed position even under maximum inlet pressure in the inlet-side chamber (19). In order to achieve this, the closing spring's (38) other end rests on a shoulder (39) formed by the second part of the guide bush (30) that is screwed into the first part and gas-tight glued-in. The face side of an adjusting screw (40) that is screwed-in and guided into the guide bush's (30) second part serves as limit stop to limit the armature's (31) opening stroke length. In order to secure the required tightness, the adjusting screw (40) is provided with a circumferential groove in which an O-ring seal (41) is placed. In order to protect the adjusting screw (40), the guide bush (30) is sealed-off by a screw cap (42) that at the same time serves to fix the coil (32) in its position.

The function of the balanced pressure regulator according to the invention described in this practical example is as follows:

The start-load valve (36) and the pressure regulating valve will be in their closed positions if the gas burner (not shown), connected downstream to the gas pressure regulator according to the invention, is out of operation. An explosive mixture is required in order to put the gas burner into operation. To supply the gas volume required for that purpose, coil (32) is electrically triggered. As a results of this, the armature (31), counteracting the closing spring's (38) force, is pushed down to its limit stop against the adjusting screw (40) whereby the start-load valve (36) opens (FIG. 1). The adjusting screw (40) can be used to pre-set the required opening stroke length, i.e. the gas volume needed. Such adjustment can be made very precisely, in particular due to the fine-pitch thread provided. Even an adjustment to limit the stroke length to a "zero" value is possible. After ignition of the gas burner is completed, the electric triggering of coil (32) is stopped, and the closing body (33) is forced by the closing spring (38) back into its seat (35). Depending on the load of the adjusting spring (12) pre-set through the pressure piece (11) and the control pressure that is now being switched on, the outlet pressure of the gas flowing to the gas burner (such pressure being equal to the pressure built up in the outlet-side chamber (22)) is controlled and kept at a constant level in a manner as is well known (FIG. 2).

What is claimed is:

1. Gas pressure regulator, comprising a gas-tight casing (1) that houses an inlet-side chamber (19) and an outlet-side chamber (22) connected with each other by a passage, where such passage forms a valve seat (24) to accommodate a valve disk (25) that is guided through a rod (28) and can be moved in axial direction inside the casing (1), and where said rod (28) is connected to a pressure diaphragm (7) at its far end seen from the valve disk (25), whereby the pressure diaphragm (7) is pressurized by the pressure built up in the outlet-side chamber (22) and pushed into closing direction, whereat the adjusting spring (12) pushes said pressure diaphragm (7) into opening direction of the valve disk (25), characterized in that the inlet-side chamber (19) and the outlet-side chamber (22) are connected to each other by one or more separate openings (34) with each of such opening forming a seat (35) for a closing body (33) that is individually assigned to said opening and guided in axial direction to its seat (35), whereat each such closing body (33) is connected to the armature (31) of an electro-magnetic drive assigned to it.

2. Gas pressure regulator according to claim 1, characterized, in that the gas pressure regulator's casing (1) and the fixing element (30) of the electro-magnetic drive are constructed as one single piece.

3. Gas pressure regulator according to claims 1, characterized in that the armature's (31) longitudinal stroke length can be adjusted.

4. Gas pressure regulator according to one of the claims 1, characterized in that the seat (35) is designed as an interchangeable element.

* * * * *